Nov. 27, 1962 A. G. SCHRAMM 3,065,993
STRADDLE TYPE LOAD DUMPING TRAILERS
Filed May 7, 1957 3 Sheets-Sheet 1
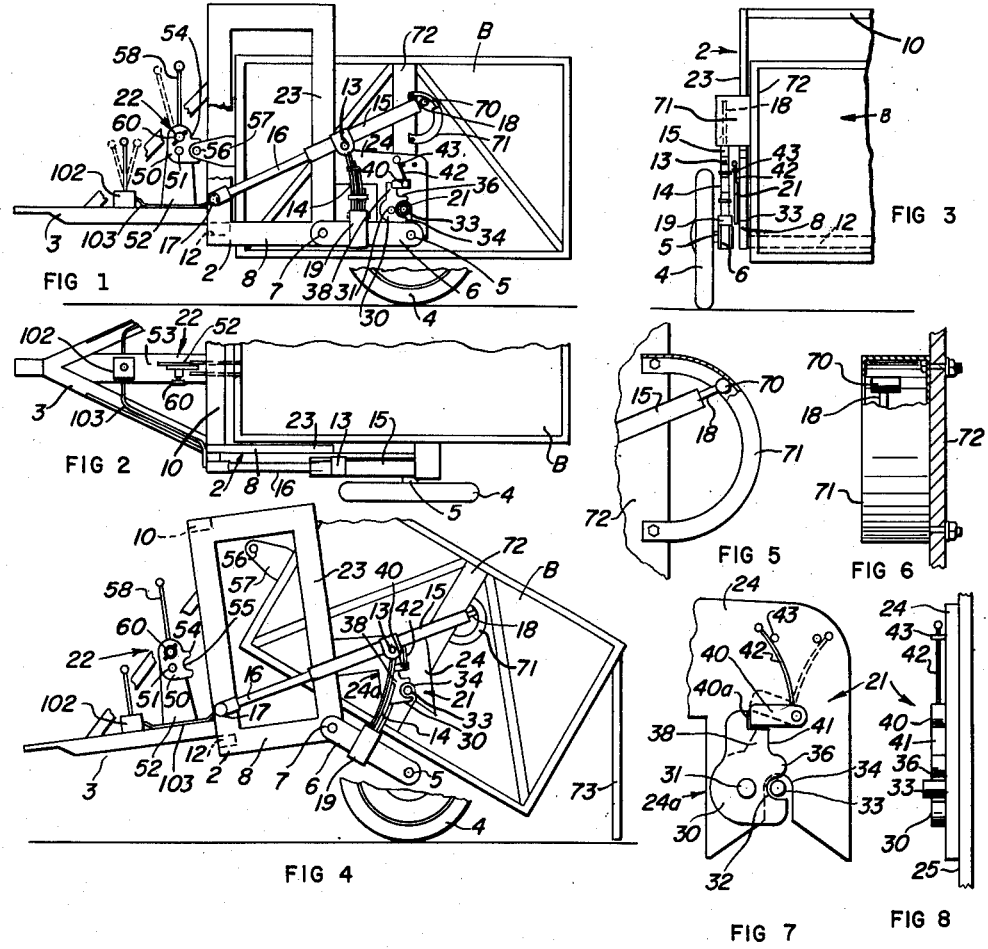
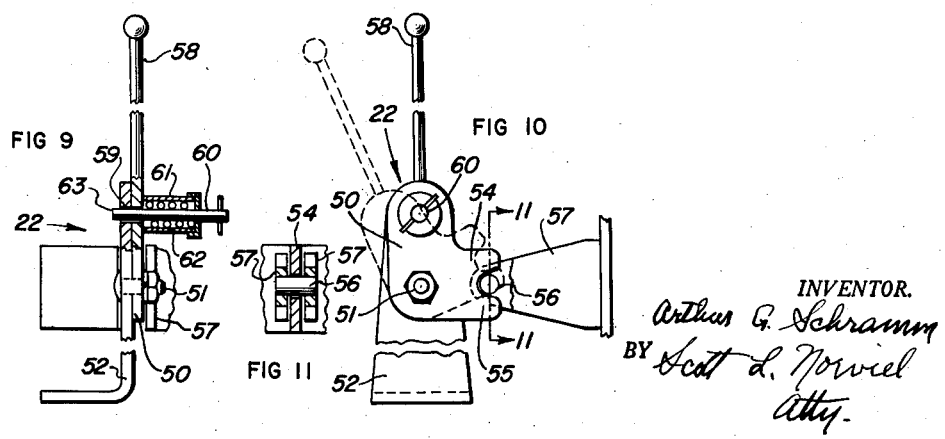
INVENTOR.
Arthur G. Schramm
BY Scott L. Norvied
Atty.

Nov. 27, 1962  A. G. SCHRAMM  3,065,993
STRADDLE TYPE LOAD DUMPING TRAILERS
Filed May 7, 1957  3 Sheets-Sheet 2
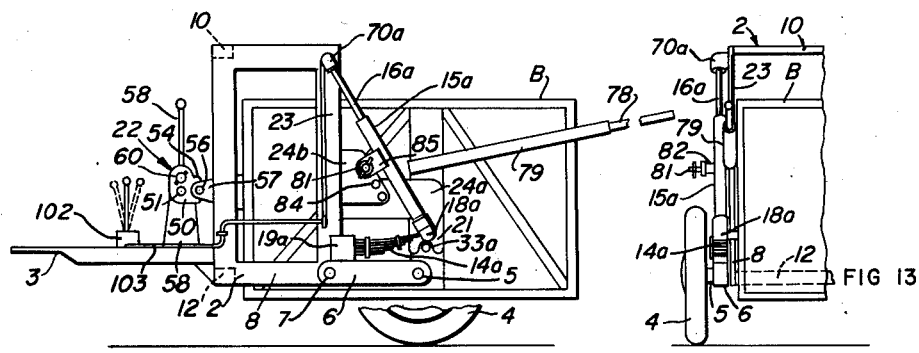
FIG 12   FIG 13
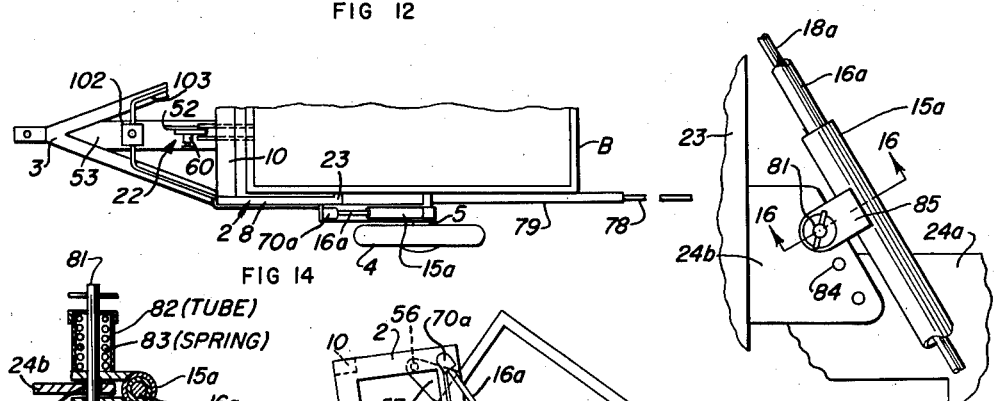
FIG 14   FIG 15
FIG 16
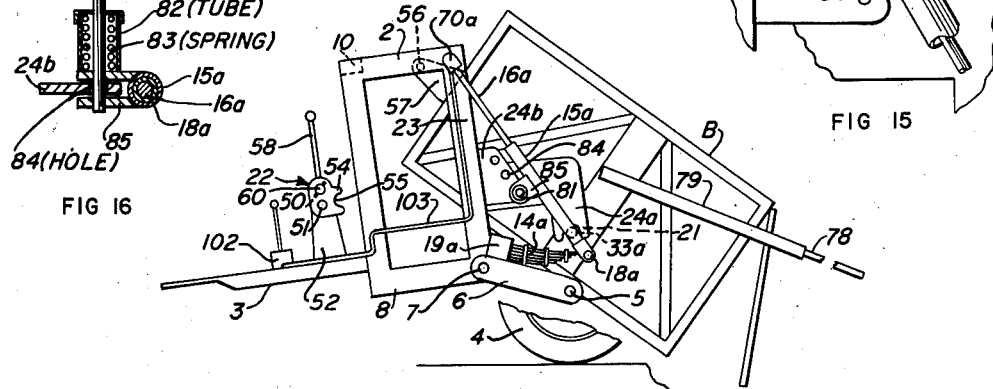
FIG 17
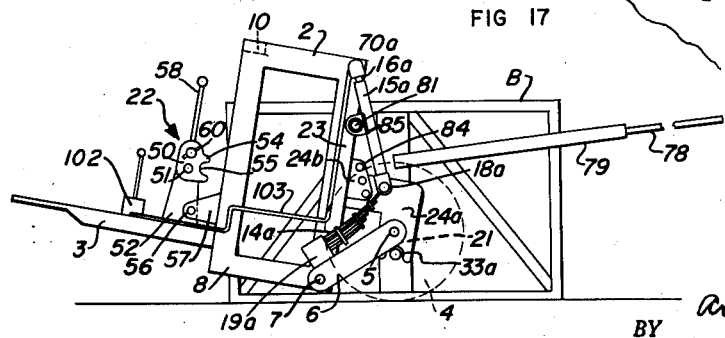
FIG 18
INVENTOR.
Arthur G. Schramm
BY
Scott L. Norvick
atty Nov. 27, 1962 A. G. SCHRAMM 3,065,993
STRADDLE TYPE LOAD DUMPING TRAILERS
Filed May 7, 1957 3 Sheets-Sheet 3

INVENTOR.
Arthur G. Schramm
BY Scott L. Novich

United States Patent Office 3,065,993
Patented Nov. 27, 1962

3,065,993
STRADDLE TYPE LOAD DUMPING TRAILERS
Arthur G. Schramm, 215 N. 28th St., Phoenix, Ariz.
Filed May 7, 1957, Ser. No. 657,591
5 Claims. (Cl. 298—5)

This invention concerns straddle type loading dumping trailers.

One of the objects of the invention is to provide a trailer having a straddle type body-frame supported by wheels adapted to raise and lower the body and means to dump a load carried in a container removably supported within the body frame;

Another object is to provide a trailer of the straddle type having wheels supported on pivotally mounted wheel arms and hydraulic mechanism for raising and lowering the frame body and dumping a load contained in a rectangular body removably supported within the frame and attached to parts of the frame by latching means;

Another object is to provide a trailer of the straddle type above mentioned with a body frame of the straddle type having no bed and having mechanism within the body for grasping rectangular objects by laterally applied squeeze mechanism;

Still another object is to provide a trailer having a body of the type above mentioned with mechanism for controlling and holding the raising and lowering mechanism at desired positions and for latching the load handling mechanism in several positions to accomplish the results desired.

Other objects will appear hereinafter.

I attain the foregoing objects by means of the devices, parts, combinations of parts and mechanism hereinafter shown in the accompanying drawings, in which—

FIGURE 1 is a side elevation of one form of an elevatable straddle type carrier having a removable load carrying box and mechanism for dumping the contents of the box;

FIGURE 2 is a partial plan view thereof;

FIGURE 3 is a rear elevation thereof showing the mechanism on one side of the body frame;

FIGURE 4 is a side elevation of the trailer shown in FIGURE 1 but with the parts moved to dumping position of the load carrying box;

FIGURE 5 is a side elevation of the hydraulic ram attachment to the load carrying box, drawn on an enlarged scale;

FIGURE 6 is an end view thereof;

FIGURE 7 is an enlarged view of the latching mechanism for attaching the load carrying box to the straddle frame body;

FIGURE 8 is an end elevation thereof;

FIGURE 9 is a front elevational view of the latch holding the front end of the load carrying box, drawn on an enlarged scale;

FIGURE 10 is a side elevational view of said front end latch;

FIGURE 11 is a transverse section of a fragment of the latch shown in FIGURE 10 taken substantially on line 11—11 of FIGURE 10;

FIGURE 12 is a side elevational view of a modified type of elevatable body straddle type carrier;

FIGURE 13 is a rear elevational view of one side of said modified trailer;

FIGURE 14 is a plan view of one side of said modified form of trailer;

FIGURE 15 is a view of the attaching means for holding the wheel raising and lowering mechanism in riding position;

FIGURE 16 is a sectional view of the latching means for the wheel holding mechanism;

FIGURE 17 is a side elevational view of the modified form of trailer, shown in FIGURE 12, but with the parts moved to dumping position;

FIGURE 18 is a side elevation of the form of trailer shown in FIGURE 12 in lowered position;

Similar numerals refer to similar parts in the several views.

Figure 19:
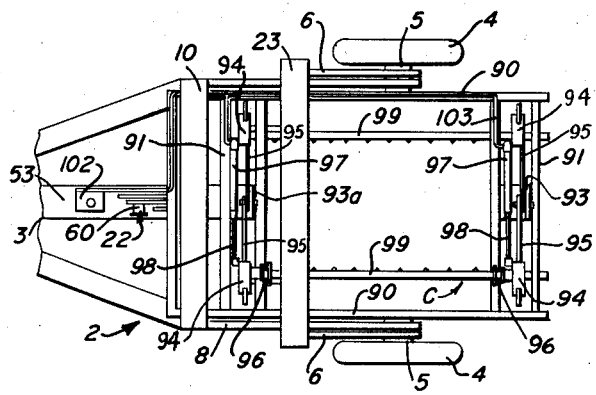
FIGURE 19 is a plan view of a trailer, as shown in FIGURES 1 and 12, but with mechanism within the body frame for grasping objects to be carried by squeeze mechanism.

In all of the forms shown the trailer, as here concerned, consists of a body frame 2, having draw bar 3 at the front and wheels 4 bearing on spindles 5 at the free ends of wheel arms 6.

The wheel arms are pivoted at 7 to the sides 8 of the body 2. The body consists of two side frames 8, transverse top bars 10 and front transverse bars 12.

The wheel arms are made in right and left pairs and each is provided with a quarter elliptical spring 14 which is attached to the arm 6 between the wheel spindle 5 and the supporting pivot bearing 7, and extends upward, substantially at right angles to the wheel arm.

A hydraulic cylinder 16 is pivoted to the body frame at 17 and its piston rod 18, operating in the cylinder, is connected at its outer end to guide sleeve 15 which slides over cylinder 16 and is pivotally connected at 13 to the outer end of spring 14, while the heavy end of the spring is clamped in a box 19 which is affixed to the wheel arm 6.

The body frame 2 is provided at the front with transverse member 12, and at the top with transverse member 10, but is open at the bottom and at the back. This permits the load carrying box B to enter into the frame 2 and for the purposes here intended this box is provided with mechanism for holding it within the frame. This mechanism consists of a pivotal latch, generally indicated by numeral 21, and a tilt latch, indicated generally by numeral 22. Latches 21 (on each side of body 2) are attached to the rear vertical members 23 by means of rearwardly extending hook plates 24.

As the device is herewith described, it is to be understood that unless otherwise specified, the hooks and latching parts and working details are right and left counter parts.

Details of one of the vertical latches 21 are shown in FIGURES 7 and 8 and include a rotary latch plate 30 pivoted on pin 31 which is set into the downwardly extending portion 24a of the rearwardly extending L shaped hook plate 24. This latch plate 30 has a notch 32 adapted to receive the trunnion pin 33 which extends outward from the side of the box B with its axis slightly forward from the center of balance of box B. Hook plate 24 has a notch 34 to receive the trunnion pin. When trunnion pin 33 contacts the lug 36, on the upper side of notch 32 in plate 30, as the hook plate is lowered onto trunnion pin 33, the plate 30 is rotated counter-clockwise to the position shown in FIGURE 7. Lug 38 on plate 30 then passes beyond the end of detent or pawl 40, pivoted on plate 24 which engages in notch 40a in the right edge 41 of the lug 38. In order to urge the detent 40 to drop downward into notch 40a, I provide an upwardly extending spring rod 42, which is positioned to yieldably engage under pin 43 on plate 24 and produce a strain or urge tending to rotate detent 40 counter-clockwise so that its free end will be forced downward into notch 40a. When latch plate 30 has moved to a position so that the lug 38 is latched by detent 40 the trunnion pin 33 is held securely in notch 34. This closed latch then carries the load of the box container B. It is to be remembered that a similar latching structure is provided on each side of the box B and frame members 23 of trailer frame 2.

Normally the box B will tend to tilt on the trunnions 33 to the dumping position shown in FIGURE 4. To prevent this, I provide the front tilt holding latch 22. This is composed of a plate 50 which is pivoted on the bolt pin 51, held on a bracket 52 which is supported on the central tongue portion 53 of tongue 3. The plate 50 is generally L shaped when viewed from the side and on the rearwardly extending leg 54 there is a notch 55 which receives pin 56 attached to the bracket 57 disposed on the center of the front end of the box B. When box B is level the bracket 57 will be held in position by the latch plate 50 by means of pin 56 in notch 55. An upwardly extending handle 58 is attached to plate 50 for rotating the latch from the engaging position, shown in FIGURE 10, to the disengaging position shown in dotted outline whereby plate 50 is rotated approximately one-fourth of a turn counter-clockwise.

In order to hold plate 50 in position, I provide the spring held latch bolt 60. This slides transversely relative to the bracket plate 52 and operates in the tube 61, while a spring 62 normally urges the inner end 63 of the bolt to the position shown in FIGURE 9. Holes, such as 59, are provided in the bracket plate 52 to receive bolt 60 at both the holding position shown in FIGURE 10, and the releasing position indicated in dotted outline, FIGURE 10.

The guide sleeve 15 is attached to the upper end of spring 14. Piston rod 18 extends onward and terminates with a roller 70. This roller bears on an arcuate stirrup bracket 71 which is attached to upright 72 in the middle of the side of the load box B. This roller pressing upon this arcuate bracket permits the piston rod to push the box B to the tilted or dumping position, shown in FIGURE 4. The arcuate stirrup provides the necessary contact to dump box B, and at the same time provides a mobile joint which permits the necessary latitude of movement between the parts. The dumping position is attained after releasing front latch 22 from the front bracket 57. After disposing of the load the action of the hydraulic cylinder 16 may be reversed and the pressure of roller 70 released from bracket 71. Thereafter the normal center of balance of the box will cause it to assume the level position as shown in FIGURE 1.

In the form of the trailer shown in FIGURES 12 through 18, the wheels are supported on arms 6 pivoted to frame 2 in the same manner as above described. The hydraulic cylinder and ram, however, is reversed in its relation to the springs 14a. The cylinder 16a is pivotally mounted on the top portion of frame 2 at 70a and the free ends of the springs 14a are attached to the outer end of piston 18a which is attached within sleeve 15a and indicated by dotted lead line. The springs 14a are set in boxes 19a so that they extend substantially parallel to wheel arms 6. There is no connection between the ram piston and the load carrying box B. This box is supported on trunnions 33a on plates 24b similar to those supporting the box previously described. Latches 21 and 22 are similarly constructed and provided, and are indicated by numerals and by lead lines with arrows. The load box B is tilted by bars 78 which are normally telescoped in carrying tubes 79 attached to the sides of the box B. These bars 78 may be pulled from the carrying tubes 79 when desired and in this manner sufficient leverage obtained so that the user may grasp the bars and manually tilt the box B to the unloading position shown in FIGURE 17. The body 2 may be raised at the same time, as shown.

The wheels 4 on arms 6 are maintained in the desired running position, as shown in FIGURE 12, or with the body 2 in raised position and the wheels relatively depressed, as shown in FIGURE 17, by spring controlled latch pin 81 operating in the tube 82, as shown in detail in FIGURE 16. The pin may be withdrawn against the urge of the spring 83 to clear the retention hole 84 in plate 24b. The ram may then be operated. Since the spring loaded pin 81 is attached to sleeve 15a by lug plates 85 the assembly, including the tube 82, moves with the sleeve and may be latched in any one of holes 84 in plate 24b.

Figure 21:
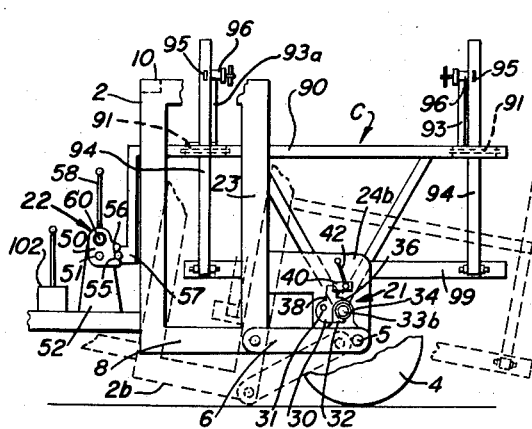
FIGURE 21 is a side elevational view of the trailer and mechanism shown in FIGURE 19, but with movement of the several parts indicated to show the lowered position of the body.
Figure 20:
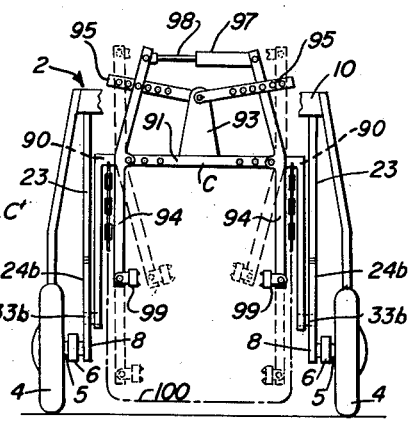
FIGURE 20 is an end view of the modification shown in FIGURE 19.

In FIGURES 19 through 21, the load box B has been replaced by a squeeze mechanism C. This mechanism consists of longitudinal frame members 90 and V-shaped frame members 89 support trunnions 33 on each side and cross members 91 at the front and rear. Trunnions 33b are attached to the lower ends of members 89. These frame members afford support for the squeeze jaws 94 which are pivotally mounted, at each end of the frame, to the front and rear members 91. Brackets 93 and 93a extend upward from the center portion of each of the end members 91. Positioning or stop bars 95 are attached to these brackets and extend outwardly. Their outer ends are attached to the upper portions of jaws 94 by spring latches 96. These latches are substantial counter parts of the latch shown in detail in FIGURE 16. At the top of the jaws there are hydraulic cylinders 97 pivotally attached to one jaw and operating rams 98 pivotally attached to the top of the opposite jaw.

The cylinder and ram afford means for forcing the upper ends of jaws 94 apart and thereby squeezing pressure plates 99 together. These are hingedly attached to the lower ends of the jaws 94.

It is to be observed that when the trailer is lowered, as indicated by dotted outlines 2b, FIGURE 21, the squeeze carrier C will be lowered toward the ground as at C' and then leveled on trunnions 33b. As herein disclosed and concerned the load carrying box B and squeeze carrier C may be considered to be portable load carrying means. Objects, such as a box or carton (not shown), may be grasped between the pressure plates 99. The grasping is done by operation of the hydraulic cylinder 97 and ram 98. After the box is grasped and raised the jaws are locked into position by inserting the latch pins 96 through holes in bars 95. Thereafter, chains or cables 100, or other weight supporting means, may be inserted under the box or load grasped by squeeze carrier C and attached to frame C and the weight of the load carried by the cables on members 91.

In all forms the hydraulic rams or cylinders may be provided with oil under pressure by pump 10 connected by pipes 103 to the cylinders.

Whereas the latching means shown in the form of the device in FIGURES 12 through 18, has the guide sleeve 15a latched directly to the frame to take the load off the hydraulic ram and cylinder when the trailer is running, it is to be understood that the form shown in FIGURES 1 through 4, a latch (not shown) may be provided between the cylinder and the guide tube 15 in a manner well known to the art. It is also to be understood that in the modification shown in FIGURES 19, 20 and 21, the straddle carrier body 2, and its elevatable running gear is substantially the same as in the other forms. The fluid for the cylinders 17 of the squeeze jaws is furnished by pump 102 through pipes and valves (not shown). In this modification use is made of the attaching means, including latches 21 to attach and detach the squeeze mechanism so that the advantages of the elevatable body 2 may be applied to objects grasped by this mechanism.

It is further to be understood that the notched hook plates 24, 24a and 24b may be considered as parts of frame or body 2 and as being a rearward extension thereof. When properly positioned and closed by latches 21 trunnions 33b will permit the box B or its equivalent to rock, or, if desired, to completely rotate.

I claim:

1. A straddle type load dumping trailer consisting of a rectangular body, having flat vertically extending laterally disposed rectangular side members, a transverse top member joining the top front portions of said side members, a transverse bottom front member joining the bottom front portions of said side members, a draw bar extending forward from the front portions of said side members; the bottom and back of said body being open, and vertically variable wheeled support for said body including wheel arms pivotally attached to the lower rear portions of said side members, wheels journalled on spindles on the free ends of said wheel arms, and means for raising and lowering said wheels with respect to said body including leaf springs rigidly attached at their butt ends to said wheel arms and extending upward substantially at right angles to said wheel arms, laterally disposed hydraulic cylinders pivotally attached to said side members, operating pistons pivotally connected to the free ends of said springs and pump means for supplying fluid under pressure to said cylinders, a box for carrying loads within said body consisting of a rectangular box body having a bottom, sides, and front end attached to said bottom, an outwardly swinging hinged rear end and an open top, trunnions centrally positioned on the sides of said box body, and a tilt latch holding plate attached to and extending forward from said box front end, hook plates attached to the rear edge portions of said body side frames having downwardly opening notches adapted to receive said trunnions on said box body, trunnion latches disposed and arranged to latch onto and retain said box trunnions in said hookplate notches when said trunnions are positioned in said notches, means for holding said box from tilting on said trunnions including a tilt latch holding plate on the front of said box, a rotary latch pivotally mounted on the tongue structure at the front of said trailer body having a notch positioned to receive and hold the tilt latch holding plate on the front of said box, and arranged to release said tilt latch plate when desired, and means for tilting said box rearward when held on said trunnions in the notches in said hook plates including arcuate stirrup plates disposed on the sides of said box above and rearward of said trunnions, and rearward extensions on said hydraulic pistons each having transverse rollers disposed to engage the inner surfaces of said respective stirrup plates to start and tilt said box body on a rearward tilting motion.

2. The device, as described in claim 1, wherein the trunnions on the sides of the box are positioned rearward of the longitudinal center of balance whereby the box is heavy at the front end when pivotally supported on said trunnions and requires positive effort from said piston rods in order to tilt rearward to dumping position.

3. The devices as described in claim 1 wherein the tilt latch holding plates on the front end of the box has a transverse latch pin and the tilt latch plate pivotally mounted on a bracket on the tongue structure has a notch disposed to receive said transverse latch pin when said box is horizontal and to release said latch pin when said latch plate is rotated to raise said notch, and wherein a spring held transverse latch pin is slidably mounted in a tube on said latch plate and is disposed so that it will engage in latch holes in said bracket to hold said latch plate in box latching position.

4. A straddle type load dumping trailer consisting of a rectangular body, having flat vertically extending laterally disposed rectangular side members, at transverse top member joining the top front portions of said side members, a transverse bottom front member joining the bottom front portions of said side members, a draw bar extending forward from the front portions of said side members; the bottom and back of said body being open, and vertically variable wheeled support for said body including wheel arms pivotally attached to the lower rear portions of said side members, wheels journalled on spindles on the free ends of said wheel arms, and means for raising and lowering said wheels with respect to said body including flat springs having their butt ends mounted on the pivoted end portions of said wheel arms and extending toward the free ends of said wheel arms substantially parallel to said arms, hydraulic cylinders having pistons and piston rods with guide sleeves covering the piston rods pivotally attached to the free ends of said springs and having cylinders pivotally attached to the upper rear portion of said body side members, and means for latching said pistons and guide sleeves in fixed positions relative to said body side plates to hold said springs in fixed position including lug plates attached to the outer surfaces of said cylinders, spring held latch pins slidably supported on said lug plates, and latching plates having a plurality of latch pin receiving holes attached to the rear portions of said body side frames, a box for carrying loads within said body consisting of a rectangular box body having a bottom, sides, and front end attached to said bottom, an outwardly swinging hinged rear end and an open top, trunnions centrally positioned on the sides of said box body side frames, hook plates attached to the rear edge portions of said trailer body side frames and extending rearwardly from said side frames, and having downwardly opening notches disposed to receive said trunnions, on said box body, trunnion latches adapted to latch onto and retain said box trunnions in said hook plate notches when said trunnions are positioned in said notches, means for holding said box from tilting on said trunnions including a tilt latch holding plate on the front of said box, a rotary latch pivotally mounted on the tongue structure at the front of said trailer body having a notch disposed to receive and hold the tilt latch holding plate on the front of said box, and to release said tilt latch plate when desired, and means for manually tilting said load carrying box when supported on said trunnions, consisting of rearwardly extending tubular handle supports attached to the sides of said box and extensible handles telescopically mounted in said handle supports.

5. A straddle type load dumping trailer consisting of a rectangular body, having flat vertically extending laterally disposed rectangular side members, a transverse top member joining the top front portions of said side members, a transverse bottom front member joining the bottom front portions of said side members, a draw bar extending forward from the front portions of said side members; the bottom and back of said body being open, and vertically variable wheeled support for said body including wheel arms pivotally attached to the lower rear portions of said side members, wheels journalled on spindles on the free ends of said wheel arms, and means for raising and lowering said wheels with respect to said body including flat springs having their butt ends mounted on the pivoted end portions of said wheel arms and extending toward the free ends of said wheel arms substantially parallel to said arms, hydraulic cylinders having pistons with guide sleeves pivotally attached to the free ends of said springs and having cylinders pivotally attached to the upper rear portion of said body side members, and means for latching said piston guide sleeves in fixed positions relative to said body side plates to hold said springs in fixed position, a box for carrying loads within said body consisting of a rectangular box body having a bottom, sides, and front end attached to said bottom, an outwardly swinging hinged rear end and an open top, trunnions centrally positioned on the sides of said box body side frames; hook plates attached to the rear edge portions of said trailer body side frames having downwardly opening notches disposed to receive said trunnions, on said box body, trunnion latches adapted to latch onto and retain said box trunnions in said hook plate notches when said trunnions are positioned in said notches, means for holding said box from tilting on said trunnions including a tilt latch holding plate on the front of said box, a rotary latch pivotally mounted on the tongue structure at the front of said trailer body having a notch disposed to receive and hold the tilt latch holding plate on the front of said box, and to release said tilt latch plate when desired, and means for manually tilting said load carrying box when supported on said trunnions, consisting of rearwardly extending tubular handle supports attached to the sides of said box and extensible handles telescopically mounted in said handle supports.

References Cited in the file of this patent

UNITED STATES PATENTS

| | | |
|---|---|---|
| 387,850 | Bex et al. | Aug. 14, 1888 |
| 420,941 | Hill | Feb. 11, 1890 |
| 465,328 | Smith | Dec. 15, 1891 |
| 670,315 | Eynon | Mar. 19, 1901 |
| 1,777,019 | Samuelsson | Sept. 30, 1930 |
| 2,316,938 | Dimick | Apr. 20, 1943 |
| 2,410,965 | Dimick | Nov. 17, 1946 |
| 2,459,506 | Demster et al. | Jan. 18, 1948 |
| 2,556,610 | Biszantz | June 12, 1951 |
| 2,718,431 | Pietroroia | Sept. 20, 1955 |
| 2,777,529 | Harbers | Jan. 15, 1957 |